United States Patent [19]

Jackson, Jr. et al.

[11] 4,287,332

[45] Sep. 1, 1981

[54] PROCESS FOR IMPROVING THE CHEMICAL RESISTANCE OF AROMATIC POLYESTERS

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 95,278

[22] Filed: Nov. 19, 1979

[51] Int. Cl.$^3$ ............................................. C08G 63/16
[52] U.S. Cl. ................................. 528/176; 264/210.5; 264/234; 264/255; 264/236; 264/346; 264/347; 528/191; 528/193
[58] Field of Search ....................... 528/176, 191, 193; 264/210.5, 234, 235, 236, 346, 347

[56] References Cited

U.S. PATENT DOCUMENTS 3,637,595  1/1972  Cottis .................................... 528/179
3,975,487  8/1976  Cottis et al. ....................... 264/210.6

Primary Examiner—Maurice J. Welsh
Attorney, Agent, or Firm—William P. Heath, Jr.; Daniel B. Reece, III

[57] ABSTRACT

Provess for improving the chemical resistance of copolyesters derived from aromatic dicarboxylic acids, certain substituted aromatic diols and, optionally, aromatic hydroxy acids. The process involves treating shaped objects made from the aromatic polyesters by subjecting them to a temperature sufficient to raise the surface temperature thereof to at least 275° C. and preferably 300° C. in air or other oxygen-containing atmospheres.

4 Claims, No Drawings

PROCESS FOR IMPROVING THE CHEMICAL RESISTANCE OF AROMATIC POLYESTERS

DESCRIPTION

1. Technical Field

This invention is a process for improving the chemical resistance of shaped objects made from aromatic polyesters prepared from aromatic dicarboxylic acids, aromatic diols, at least 5 mole percent based on all repeating units of certain substituted aromatic diols and, optionally, aromatic hydroxy acids.

The process involves treating shaped objects made from certain aromatic polyesters by subjecting them to a temperature sufficient to raise the surface temperature thereof to at least 275° C. and preferably 300° C. in air or other oxygen-containing atmospheres.

2. Background Art

Many of the polyesters which may be used in the process of this invention are disclosed in U.S. Pat. No. 4,118,372. U.S. Pat. No. 3,975,487 discloses heating fibers of aromatic polyesters in air to increase their tensile properties, but the examples and claims disclose only polyesters containing no substituents attached to the aromatic rings. The specification does disclose the use of substituted hydroquinones, however (column 4, lines 25–32; U.S. Pat. No. 3,637,595, column 4, line 72 to column 5, line 3). We found that fibers made from our polymers containing substituents do not become insoluble under conditions films become insoluble.

DISCLOSURE OF INVENTION

This invention is a process for improving the chemical resistance of copolyesters derived from aromatic dicarboxylic acids, certain substituted aromatic diols, and, optionally, aromatic hydroxy acids. After being heated in air or an oxygen-containing atmosphere at temperatures of at least 275° C. and preferably at about 300° C., shaped objects of these polyesters exhibit improved chemical resistance. Because of this thermal treatment, it is preferable that the polyesters have softening or melting points above the treatment temperature to avoid deformation of the shaped object being treated.

Particularly the invention involves a process for improving the chemical resistance of shaped objects made from aromatic polyesters, the process comprising providing a shaped object formed from a copolyester derived from aromatic dicarboxylic acids, aromatic diols, optionally aromatic hydroxy acids, and at least 5 mole percent based on all repeating units of a substituted aromatic diol containing at least one substituent selected from the group of chlorine atoms, bromine atoms, alkyl groups containing one to three carbon atoms, alkoxy groups containing one to three carbon atoms and tolyl, and subjecting the shaped object to a temperature of at least 275° C. in an oxygen-containing atmosphere to raise the surface temperature of the shaped object to at least 275° C. and maintaining the surface temperature for a period sufficient to effect modification of the surface to improve its resistance to solvents. It is preferred that the surface temperature of the shaped objects be raised to about 300° C. or more, depending upon the softening or melting points of the shaped object.

The polyesters may be prepared from aromatic dicarboxylic acids and the diacyl esters of certain substituted aromatic diols containing at least one substituent selected from the group consisting of chlorine atoms, bromine atoms, alkyl groups containing one to three carbon atoms, alkoxy groups containing one to three carbon atoms, and tolyl. The aromatic diol containing at least one substituent may be hydroquinone, resorcinol, a dihydroxybiphenyl, a naphthalenediol, or an alkylidenebisphenol, such as 4,4'-isopropylidenediphenol (also known as bisphenol A). At least 5 mole percent of the substituted aromatic diol is used, based on the total number of repeating units (diols, dicarboxylic acid and, if present, hydroxy acid). The preferred aromatic diol containing at least one substituent is hydroquinone. Examples of the substituted aromatic diols which may be employed include chlorohydroquinone, dichlorohydroquinone, methylhydroquinone, dimethylhydroquinone, trimethylhydroquinone, bromohydroquinone, methoxyhydroquinone, ethoxyhydroquinone, p-tolylhydroquinone, tetrachlorobisphenol A, tetrabromobisphenol A, tetramethylbisphenol A, the chlorinated naphthalenediols, the chlorinated dihydroxybiphenyls, and the methyl-substituted dihydroxybiphenyls. The preferred substituted aromatic diols are chlorohydroquinone and methylhydroquinone.

The diacyl derivatives of the aromatic diols used in this invention are made by known methods employing lower acyl halides or anhydrides containing two to eight carbon atoms in the acyl group. The acetyl and propionyl derivatives are preferred, but butyryl, isobutyryl, or benzoyl derivatives are examples of others which may also be used.

Aromatic dicarboxylic acids are used in the preparation of the polymers of this invention because they impart the high softening and melting points needed for the polymers to withstand the high treatment temperatures without deformation. Examples of such acids are terephthalic acid, 2,6-naphthalenedicarboxylic acid, 4,4'-oxydibenzoic acid, monochloroterephthalic acid, dichloroterephthalic acid, methylterephthalic acid, dimethylterephthalic acid, isophthalic acid, and 4,4'-diphenyldicarboxylic acid. Terephthalic acid is the preferred acid. More than one aromatic dicarboxylic acid component may be used in the preparation of a composition. The polyesters may also be prepared with alicyclic dicarboxylic acids, such as trans-1,4-cyclohexanedicarboxylic acid, and aliphatic dicarboxylic acids, such as suberic acid, as long as the softening or melting points are sufficiently high for the polymer to withstand the treatment temperature.

Aromatic hydroxy acids, such as p-hydroxybenzoic acid, m-hydroxybenzoic acid, 6-hydroxy-2-napthoic acid, and 4-hydroxy-1-naphoic acid, also may be used to prepare useful copolyesters. In addition the polyesters discussed in U.S. Pat. No. 4,118,372 prepared with substituted aromatic diols and having suitably high softening or melting points may be used in the process of this invention.

As has been described, the polymers of the invention are made by conventional techniques from aromatic dicarboxylic acids, diesters of suitable aromatic diols and, optionally, aromatic hydroxy acids. The reactants are heated at about 300° C. until most of the monocarboxylic acid has evolved. The temperature of the melt is then increased to about 350° C. (up to 395° C. for higher melting compositions), a vacuum of about 0.5 millimeter is applied and stirring is continued until a high-melt-viscosity polymer is obtained. If the polymer solidifies, its molecular weight may be increased to a sufficient value by heating particles of the polymer in an inert atmosphere or under reduced pressure at a temperature just below the softening point of the polymer. The molecular weights are high enough for the polymer to be fiber and film forming.

Tough films are obtained by pressing or by extrusion. Molding plastics are obtained by injection molding at about 350°–400° C. The copolyesters of this invention may be fabricated to give other types of shaped objects such as foamed plastics, extruded shapes and coatings. The compositions of this invention also may contain nucleating agents, pigments, glass fibers, asbestos fibers, antioxidants, stabilizers, plasticizers, lubricants, fillers and other additives.

Shaped objects, excluding fibers, of the compositions of this invention have surprisingly improved chemical resistance after being heated in air or an oxygen-containing atmosphere at temperatures of at least 275° C. and preferably at least 300° C. Fibers are excluded from this invention because they do not become insoluble under treatment conditions that films, molded articles and other shaped objects become insoluble. Surprisingly, films with a sufficiently high molecular weight to be creaseable without breaking before being heated are still tough and creaseable after being heated in air to make them insoluble. The mechanism by which the increase in chemical resistance occurs is thought to be a branching and crosslinking process involving the surface of the shaped objects.

This invention will be further illustrated by the following examples although it will be understood that these examples are included merely for purposes of illustration and are not intended to limit the scope of the invention.

EXAMPLES

All inherent viscosities are determined at 25° C. in a 40/35/25 weight mixture of p-chlorophenol/tetrachloroethane/phenol at a concentration of 0.1 g./100 ml. The melting points are determined with a Perkin-Elmer DSC-2 differential scanning calorimeter. To improve the chemical resistance, 10-mil films are pressed and placed in glass tubes which are then heated in an aluminum block while air is passed in at a rate of 2 standard cubic feet per hour. The solubilities are determined by stirring the films in a 65/35 (by volume) solution of methylene chloride/trifluoroacetic acid at room temperature for one hour and then allowing them to stand for several hours. The films designated as "insoluble" also showed no indication of swelling.

1. This example illustrates the preparation of a copolyester from 50 mole percent terephthalic acid, 25 mole percent 2-methylhydroquinone diacetate and 25 mole percent 2-phenylhydroquinone dipropionate. A mixture of 16.6 g. (0.10 mole) terephthalic acid, 10.5 g. (0.0505 mole) 2-methylhydroquinone diacetate and 15.0 g. (0.0505 mole) 2-phenylhydroquinone dipropionate is placed in a 100-ml. flask equipped with a stirrer, a short distillation column and an inlet for nitrogen. The flask is evacuated and purged three times with nitrogen before being lowered into a Wood's metal bath maintained at 140° C. The mixture is heated under a nitrogen atmosphere with stirring to a temperature of 295° C. at which point acetic and propionic acids begin to distill rapidly from the flask. After the reaction mixture is heated with stirring at this temperature for 90 minutes, the temperature of the bath is increased to 360° C. A vacuum of 0.5 millimeter of mercury is then applied over a period of 10 minutes. After stirring is continued under 0.5 millimeter of mercury at 360° C. for 5 minutes, a medium melt viscosity, opaque, light tan polymer is obtained. The polymer has an inherent viscosity of 1.9 and a crystalline melting point at 327° C. A film can be pressed easily at 360° C.

Copolyesters prepared in the melt with 10–35 mole percent chloro- or methylhydroquinone have a single weak crystalline melting point (at about 320° C. for the chlorohydroquinone-modified copolyesters and at about 330° C. for the methylhydroquinone-modified copolyesters). Many of the copolymers with higher inherent viscosities prepared by solid-state polymerization have two crystalline melting points—one at about 320°–330° C. and one generally at about 370° C.

The following table summarizes the solubility date of films of poly(phenyl-1,4-phenylene terephthalate) modified with 0 to 35 mole percent chlorohydroquinone and methylhydroquinone and heated in air at 300° C. for 30 minutes and 40 minutes. Except for the film from the copolymers modified with 30 and 35 mole percent chlorohydroquinone, all films were soluble before the thermal treatment.

| Comonomer, Mole Percent[a] | | I.V. | Solubility 30 Min.[b] | 40 Min.[b] |
| --- | --- | --- | --- | --- |
| — | 0 | 1.7 | Soluble | Mostly soluble |
| Chlorohydroquinone, | 10 | 1.6 | Soluble | Highly swollen |
| Chlorohydroquinone, | 15 | 2.5 | Soluble | Slightly swollen |
| Chlorohydroquinone, | 20 | 1.8 | Insoluble | Insoluble |
| Chlorohydroquinone, | 25 | 1.6 | Insoluble | Insoluble |
| Chlorohydroquinone, | 30 | 1.5 | Insoluble | Insoluble |
| Chlorohydroquinone, | 35 | Insol. | Insoluble | Insoluble |
| Methylhydroquinone, | 10 | 1.8 | Soluble | Highly swollen |
| Methylhydroquinone, | 15 | 3.3 | Soluble | Slightly swollen |
| Methylhydroquinone, | 20 | 1.8 | Insoluble | Insoluble |
| Methylhydroquinone, | 25 | 1.9 | Insoluble | Insoluble |
| Methylhydroquinone, | 30 | 1.8 | Insoluble | Insoluble |
| Methylhydroquinone, | 35 | 1.4 | Insoluble | Insoluble |

[a]Based on all repeating units.
[b]Time heated in air at 300° C.

An appreciably longer thermal treatment time is required at 275° C.; for example the above copolyesters prepared with 20 mole percent chlorohydroquinone and methylhydroquinone are insoluble after a four-hour treatment time at 275° C.

After heat treatment under conditions which make the above films insoluble, fibers of the above compositions are completely or almost completely soluble. For example a melt-spun fiber of the above polyester prepared with 25 mole percent chlorohydroquinone and having a denier of 2.8 and a tenacity of 3.0 grams per denier is soluble in the solvent mixture after a heat treatment of 30 minutes in air of 300° C. Similarly a fiber of the polyester prepared with 25 mole percent methylhydroquinone is almost completely soluble after the same heat treatment.

2. This example illustrates the use of tolylhydroquinone in a polyester. Using the procedure described in Example 1, a polymer is prepared from 10 g. (0.06 mole) of terephthalic acid and 20 g. (0.0606 mole) of tolylhydroquinone dipropionate. The opaque, light tan polymer has an inherent viscosity of 1.5 and a crystalline melting point of 314° C. A film, pressed at 360° C., is soluble in 65/35 methylene chloride/trifluoroacetic acid and becomes insoluble after being heated in air at 300° C. for 15 minutes or at 275° C. for 2 hours.

3. This example illustrates the use of methoxyhydroquinone. Using the method described in Example 1, a copolymer is prepared from 14.9 g. (0.09 mole) terephthalic acid, 2.16 g. (0.01 mole) 2,6-naphthalenedicarboxylic acid and 25.2 g. (0.1 mole) methoxyhydroquinone dipropionate. The opaque, light brown polymer has an inherent viscosity of 2.7 and a crystalline melting point of 303° C. A film, pressed at 325° C., is soluble in 65/35 methylene chloride/trifluoroacetic acid and becomes insoluble after being heated in air at 295° C. for 30 minutes.

4. This example illustrates the use of 5 mole percent tetrachlorobisphenol A, based on all repeating units. Using the method described in Example 1, a copolymer is prepared from 16.6 g. (0.1 mole) terephthalic acid, 26.8 g. (0.09 mole) phenylhydroquinone dipropionate and 4.8 g. (0.01 mole) tetrachlorobisphenol A diacetate. The opaque, brown polymer has an inherent viscosity of 1.7 and a softening point of 322° C. A film, pressed at 380° C., is soluble in 65/35 methylene chloride/trifluoroacetic acid and becomes only slightly swollen after being heated in air at 300° C. for 40 minutes and insoluble after 60 minutes.

5. This example illustrates the improved chemical resistance of a polyester of chlorohydroquinone after a heat treatment of 15 minutes in air at 300° C. or 2 hours at 275° C. Using the method described in Example 1, a copolymer is prepared from 11.6 g. (0.07 mole) terephthalic acid, 6.5 g. (0.03 mole) 2,6-naphthalenedicarboxylic acid and 22.8 g. (0.1 mole) chlorohydroquinone diacetate. The opaque, dark gray polymer has a melting point of 313° C. A film, pressed at 350° C., is soluble in 65/35 methylenechloride/trifluoroacetic acid and becomes insoluble after being heated in air at 300° C. for 15 minutes. The film also becomes insoluble after being heated in air at 275° C. for 2 hours.

6. Example 4 is repeated except the copolymer is prepared with methylhydroquinone diacetate instead of chlorohydroquinone diacetate. The copolymer has an inherent viscosity of 3.8. A film, pressed at 375° C., is soluble in 65/35 methylenechloride/trifluoroacetic acid and becomes insoluble after being heated in air at 300° C. for 15 minutes.

7. This example shows the insolubilization of a film of a copolymer of p-hydroxybenzoic acid, 4,4'-oxydibenzoic acid and methylhydroquinone. Using the method described in Example 1, a copolymer is prepared from 18.0 g. (0.1 mole) p-acetoxybenzoic acid, 25.8 g. (0.1 mole) 4,4'-oxydibenzoic acid and 20.8 g. (0.1 mole) methylhydroquinone diacetate. A film pressed at 350° C. is soluble in 65/35 methylene chloride/trifluoroacetic acid and becomes insoluble after being heated in air at 300° C. for 15 minutes or at 275° C. for 2 hours.

8. This example shows the insolubilization of a film of a copolymer of p-hydroxybenzoic acid, terephthalic acid and p-tolylhydroquinone. Using the method described in Example 1, a copolymer is prepared from 18.9 g. (0.105 mole) p-acetoxybenzoic acid, 7.5 g. (0.045 mole) terephthalic acid and 14.0 g. (0.045 mole) p-tolylhydroquinone dipropionate. The copolymer has an inherent viscosity of 1.9. A film pressed at 375° C. is soluble in 65/35 methylene chloride/trifluoroacetic acid and becomes insoluble after being heated in air at 300° C. for 60 minutes.

The invention has been described in detail with particular reference to preferred embodiments thereof, but it will be understood that variations and modifications can be effected within the spirit and scope of the invention.

We claim:

1. Process for improving the chemical resistance of shaped objects made from aromatic polyesters, the process comprising providing a shaped object formed from a copolyester derived from aromatic dicarboxylic acids, aromatic diols, optionally aromatic hydroxy acids, and at least 5 mole percent based on all repeating units of a substituted aromatic diol containing at least one substituent selected from the group of chlorine atoms, bromine atoms, alkyl groups containing one to three carbon atoms, alkoxy groups containing one to three carbon atoms and tolyl, and subjecting said shaped object to a temperature of at least 275° C. in an oxygen-containing atmosphere to raise the surface temperature of said shaped object to at least 275° C. and maintaining said surface temperature for a period sufficient to effect modification of said surface to improve its resistance to solvents.

2. Product of the process of claim 1.

3. Process of claim 1 wherein the surface temperature of said shaped object is raised to about 300° C. or more.

4. Product of the process of claim 3.

* * * * *